(12) United States Patent
Kollep et al.

(10) Patent No.: US 6,725,762 B2
(45) Date of Patent: Apr. 27, 2004

(54) DEVICE FOR THE EXTRACTION OF A SUBSTANCE HAVING A MOVEABLE COMPONENT

(75) Inventors: Alexandre Kollep, Lutry (CH); Daniel Fischer, Romanshorn (CH); Mischa Stieger, St.-Gallen (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/285,457

(22) Filed: Nov. 1, 2002

(65) Prior Publication Data

US 2003/0056655 A1 Mar. 27, 2003

Related U.S. Application Data

(63) Continuation of application No. PCT/EP01/04076, filed on Apr. 10, 2001.

(30) Foreign Application Priority Data

May 4, 2000 (EP) .............................. 00109495

(51) Int. Cl.[7] .............................. A47J 31/24; A47J 31/30
(52) U.S. Cl. .............................. 99/283; 99/293; 99/295; 99/302 R
(58) Field of Search .............................. 99/283, 293, 295, 99/300, 302 R

(56) References Cited

U.S. PATENT DOCUMENTS 2,283,967 A * 5/1942 Brown .............................. 99/289 R
3,209,676 A * 10/1965 Zimmermann et al. ... 99/289 R
4,632,024 A * 12/1986 Cortese .............................. 99/293
4,947,738 A * 8/1990 Eugster .............................. 99/293
5,207,149 A * 5/1993 Weber .............................. 99/293
5,402,707 A   4/1995 Fond et al. .............................. 99/295
5,897,899 A * 4/1999 Fond .............................. 426/112

FOREIGN PATENT DOCUMENTS

EP    0 862 882 A1   9/1998
GB       939 814     10/1959

* cited by examiner

Primary Examiner—Reginald L. Alexander
(74) Attorney, Agent, or Firm—Winston & Strawn LLP

(57) ABSTRACT

The present invention relates to a device for the extraction of a substance for the preparation of a beverage. This device includes a fixed first component, and a second component moveable relative to the first along an axis of rotation arranged at the rear of the two components. The front of each component forms a housing for the substance to be extracted, and the device includes a member that is integral with the fixed and moveable parts for closing and opening the components. The device also includes a control and a valve associated with the control, with these components placed on the upper part of the moveable second component in such a way that the control and valve are near the housing wherein the substance is to be extracted.

21 Claims, 3 Drawing Sheets

DEVICE FOR THE EXTRACTION OF A SUBSTANCE HAVING A MOVEABLE COMPONENT

CROSS-REFERENCE TO RELATED APPLICATIONS

This application is a continuation of the U.S. national phase designation of International application PCT/EP01/04076, filed Apr. 10, 2001, the content of which is hereby expressly incorporated herein by reference thereto.

FIELD OF THE INVENTION

The present invention relates to a device for the extraction of a substance for the preparation of a beverage. This device has a fixed first component and a second component that is moveable relative to the first component along an axis of rotation arranged at the rear of the components. The front of each component forms a housing for the substance to be extracted, and the device includes means that are integral with the fixed and moveable parts for closing and opening them. This device is useful for providing coffee from a closed cartridge that contains coffee solids.

BACKGROUND OF THE INVENTION

In known coffee machines for the extraction of closed cartridges, for example the device which is the subject of the U.S. Pat. No. 5,402,707, there are no moveable parts, so that the machine is in one piece and the water which stands in order to arrive at the housing of the substance to be extracted is in a hot environment, to be precise at a temperature of the order of 90° C. There is therefore no risk that the temperature of the water will fall.

By contrast, in a machine with a moveable component, such as, for example, those described in U.S. Pat. No. 5,649,472 and PCT patent application WO 94/02059, the heating body of the machine is not in proximity to the housing for the substance to be extracted. The result is that, if the control for starting the machine and the valve integrated in the machine are placed at some distance from the housing for the substance to be extracted, there is a certain amount of standing water left in the device. In fact, the valve makes it possible for the heating body to empty as far as the valve, but not beyond it. The connecting pipe between the housing for the substance to be extracted and the valve remains full of water, which eventually cools when the device is not in use. The more time elapses between two successive coffee preparations, the more the temperature of the water will fall and the greater will be the effect on the temperature on the coffee prepared afterwards.

There is thus a need to reduce the amount of standing water in such machines, so that, from the moment when the machine is put into operation, there is only a slight or negligible effect on the temperature of the prepared coffee.

SUMMARY OF THE INVENTION

The present invention relates to a flowable-food preparation device with first and second components and an extraction housing associated therewith. The extraction housing receives a substance and a fluid therein and is configured for extracting the substance with the fluid to provide the flowable food. The first component is movable for opening the housing for receiving the substance and closing the housing for extracting the substance and fluid. A valve is mounted on the first component, and a fluid intake is associated with the valve for feeding the fluid thereto. The valve is configured for selectively directing the fluid to or substantially flow of the fluid to the housing.

In a preferred embodiment, the second component is substantially fixed against rotation, and the first component is rotatable for opening and closing the housing. Preferably, the first and second components are rotatably connected at an axis of rotation.

The preferred housing is configured for receiving a substance container that contains the substance. A feeding member is associated with the housing and configured for feeding the fluid into the container. Additionally, the feeding member of this embodiment comprises a piercing member configured for piercing the container to feed the fluid into the container.

A valve control preferably is manipulable by a user and operably associated with the valve for controlling the valve. The valve control can include a lever that is pivotable for operating the valve.

The valve preferably is also operable to direct the fluid away from the housing, the liquid intake being connected for delivering the fluid such that the fluid is aqueous, and the outlet conduit is configured for delivering the fluid as steam. The valve can have a first position for directing the fluid to the housing, a second position for directing the fluid to an outlet, and a third position for directing the fluid to a third conduit.

In one embodiment, the food is a beverage, preferably a coffee machine, and the device is a beverage machine configured for preparing the beverage. The valve is configured for directing the fluid to a rejection conduit for rejecting the fluid. The liquid intake can be connected for delivering the fluid. The fluid can be aqueous, with the outlet conduit configured for delivering the fluid as steam. Preferably, the beverage machine is configured for placement and filling of a cup under the extraction housing.

Preferably, the valve comprises a disk with a switching slot for selectively directing the fluid to or away from the housing, and can be made of a ceramic. In one embodiment, the device includes electronics associated with the valve for operating stopping further fluid from reaching the housing once a predetermined volume of fluid, such as for a drinking cup, has been directed to the housing. The preferred location of the valve is sufficiently near the housing such that a volume of standing fluid of less than about 3 ml remains therebetween when the valve stops the fluid from flowing to the housing.

BRIEF DESCRIPTION OF THE DRAWING

The balance of the description is made with reference to the drawing figures in which.

DETAILED DESCRIPTION OF THE PREFERRED EMBODIMENTS

Figure 1:
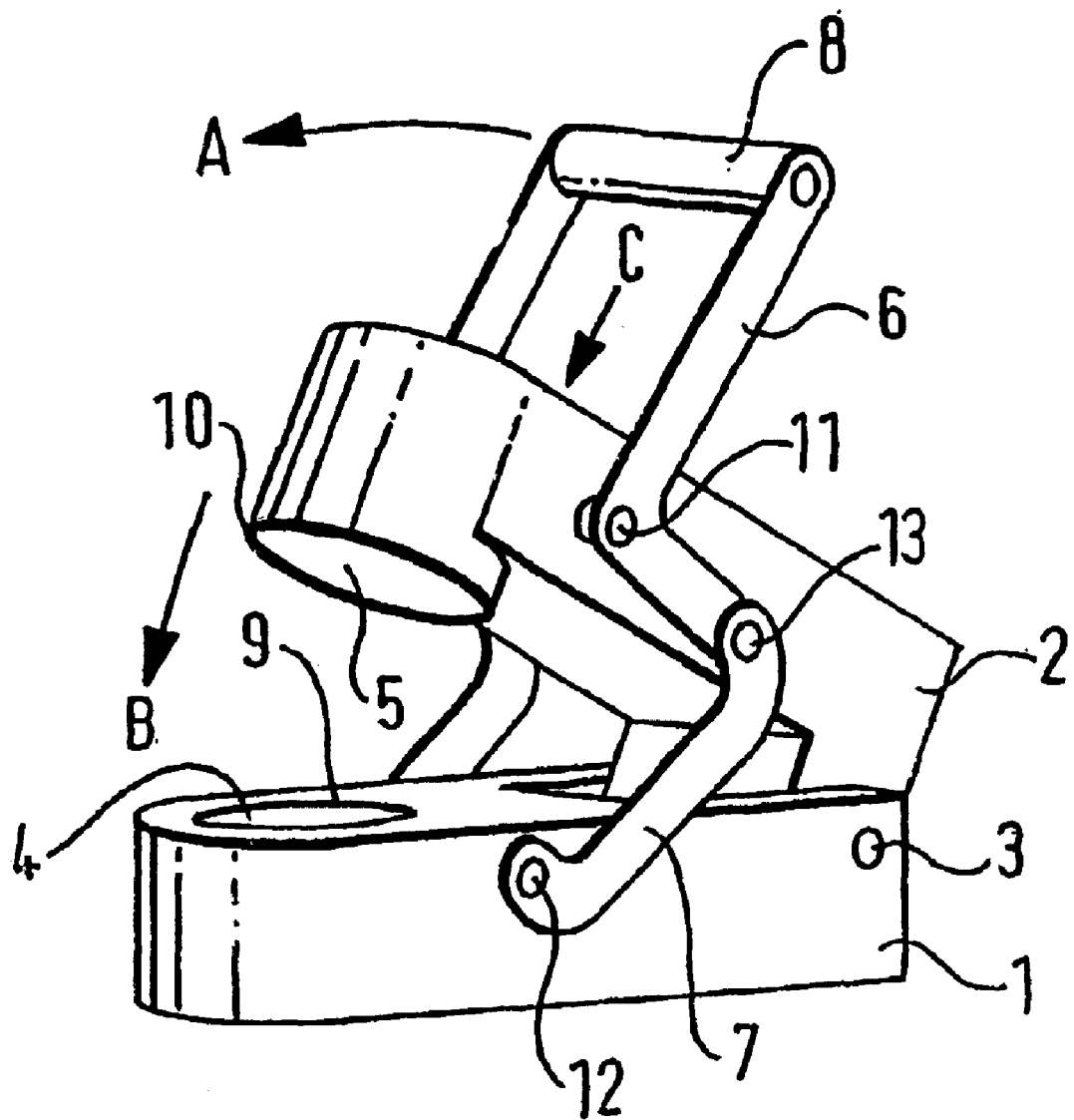
FIG. 1 shows a perspective diagrammatic view of a device for the preparation of a beverage having a moveable component.

The present invention relates to a device for the extraction of a substance for the preparation of a beverage, in which the device comprises a control and a valve associated with the control. These components are placed on the upper part of the moveable second component, in such a way that the control and valve are positioned near the housing where the substance is to be extracted.

This arrangement results in a significant reduction in the amount of standing water. For example, without the arrangement according to the invention, a volume of standing water on the order of 10–15 ml occurs, whereas, according to the invention, the volume of standing water is reduced to 1–3 ml. This means that, for a coffee volume of the order of 40–100 ml, even after a relatively long intermission between beverage preparations the first cup of coffee made after the intermission has the same temperature as the others made by the device according to the invention. This is certainly not the case in conventional systems, which typically provide subsequently prepared coffee having a temperature that is as much as 5° C. lower than previously prepared coffee because of the high volume of standing water.

The means for closing and opening the two components may be of any type, in particular those described in International Patent Application PCT/EP00/08189.

The control of the system acts directly on the direction assumed by the water, that is to say on the valve for distributing the water. In the device according to the invention, the control and the associated valve have a position of rest, a beverage preparation position and a steam formation position. In the position of rest, the residual water is rejected. This rejection preferably takes place only at the moment when the control is switched into the position of rest, that is to say at the end of extraction, for example of a coffee cartridge. In the beverage preparation position, the water coming from the heating body passes directly into the housing for the substance to be extracted, for a duration necessary for extracting the cartridge. As mentioned above, at the end of extraction, there is a return to the position of rest. The last position is the steam generation position, for example in order to heat the milk during the preparation of a cappuccino coffee.

The type of valve that can be used according to the invention is not critical. A ceramic valve is preferably used.

The device according to the invention is normally actuated manually. It is also possible for the valve provided to be a solenoid valve controlled by electronics making it possible to stop the coffee at a preprogrammed volume.

As shown in the figures, an embodiment of a device for beverage preparation comprises:

a fixed first component (1), and a second component (2) moveable relative to the first along an axis of rotation (3) arranged at the rear of the two components, with the front of each component (1, 2) forming a housing (4) and (5), respectively, for the substance to be extracted.

The device furthermore comprises means for closing and opening the two components, with the means preferably comprising a two-armed closing lever (6) and two pull rods (7).

This device and also its functioning are already described in International Patent Application PCT/EP00/08189, the content of which is hereby expressly incorporated herein by reference thereto.

A closing lever (6) comprises the gripping part (8) and the actual lever part which has a virtually 90° bend. The pull rod may be straight or, as shown in FIG. 1, have curved ends. One housing portion (4) comprises a peripheral rim (9) while the other housing portion (5) has a peripheral rim (10).

The two arms of the closing lever (6) are fastened rotatably along a first axis (11) on either side of the second component (2) and the pull rods (7) are fastened rotatably along a second axis (12) on either side of the first component (1). Those two ends of the two arms of the closing lever which are opposite the gripping part (8) and the two ends of the pull rods (7) are integral with one another along a third moveable axis (13), in such a way that the closing lever cooperates with the rods in order to ensure the closing and opening of the device according to the invention.

The consumer arranges in the housing portion (4) a substance container, such as a capsule or cartridge, with the substance to be extracted. The user then pulls the gripping part (8) of the closing lever (6) forwards in the direction of the arrow A, so as to cause said lever to rotate about its axis (11), this then driving the pull rod (7) upwards along the axis (13) and causing the moveable part (2) to descend (arrow B) towards the fixed part (1). The closing position is assumed when the closing lever is substantially in a horizontal position and the pull rods are in a vertical position. At this moment, the peripheral rims (9, 10) of the housing portions (4, 5) face one another and ensure that the device has a high degree of leak-tightness.

Figure 2:
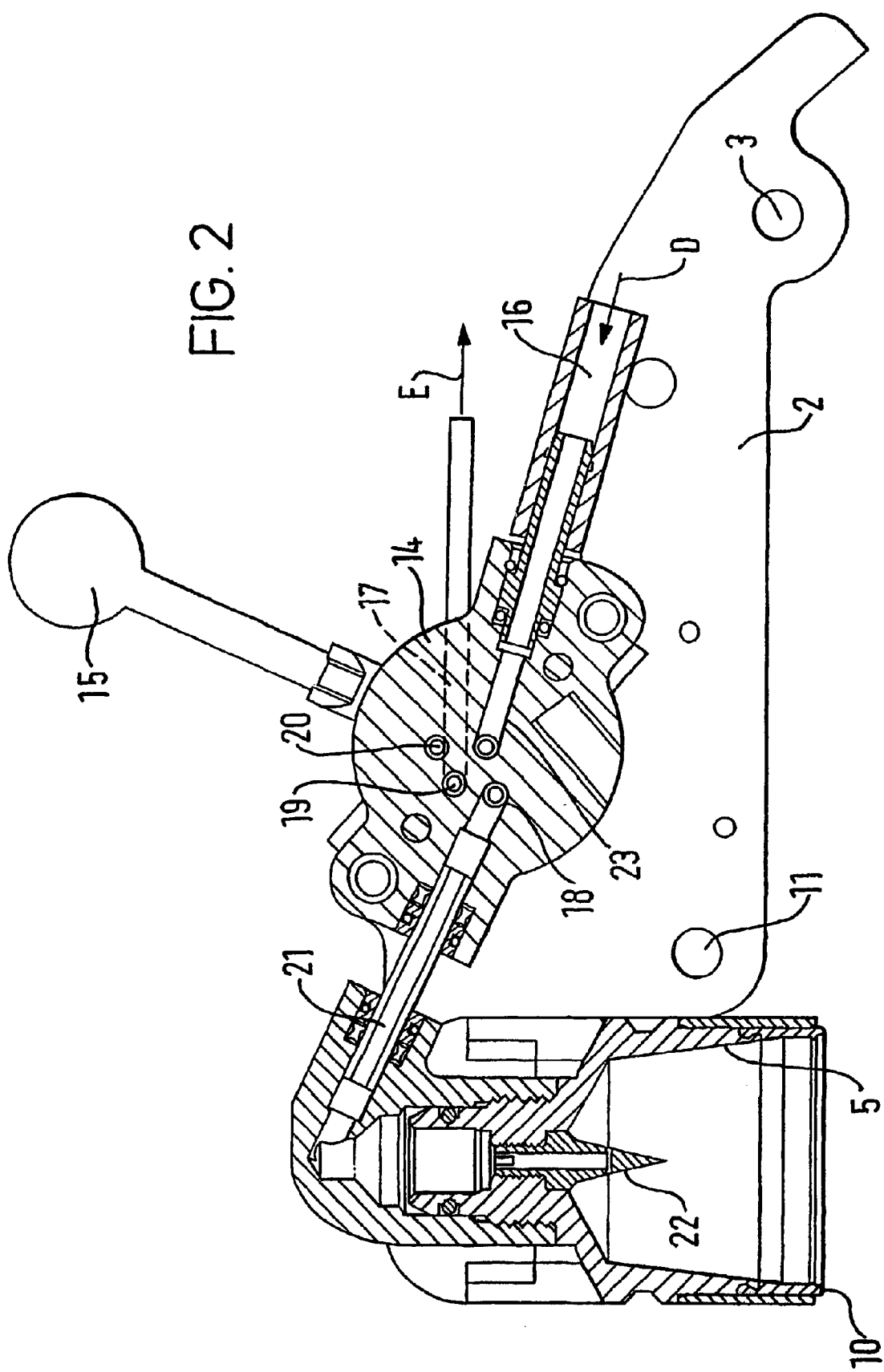
FIG. 2 is a cross-sectioned view of the device at rest.
Figure 3:
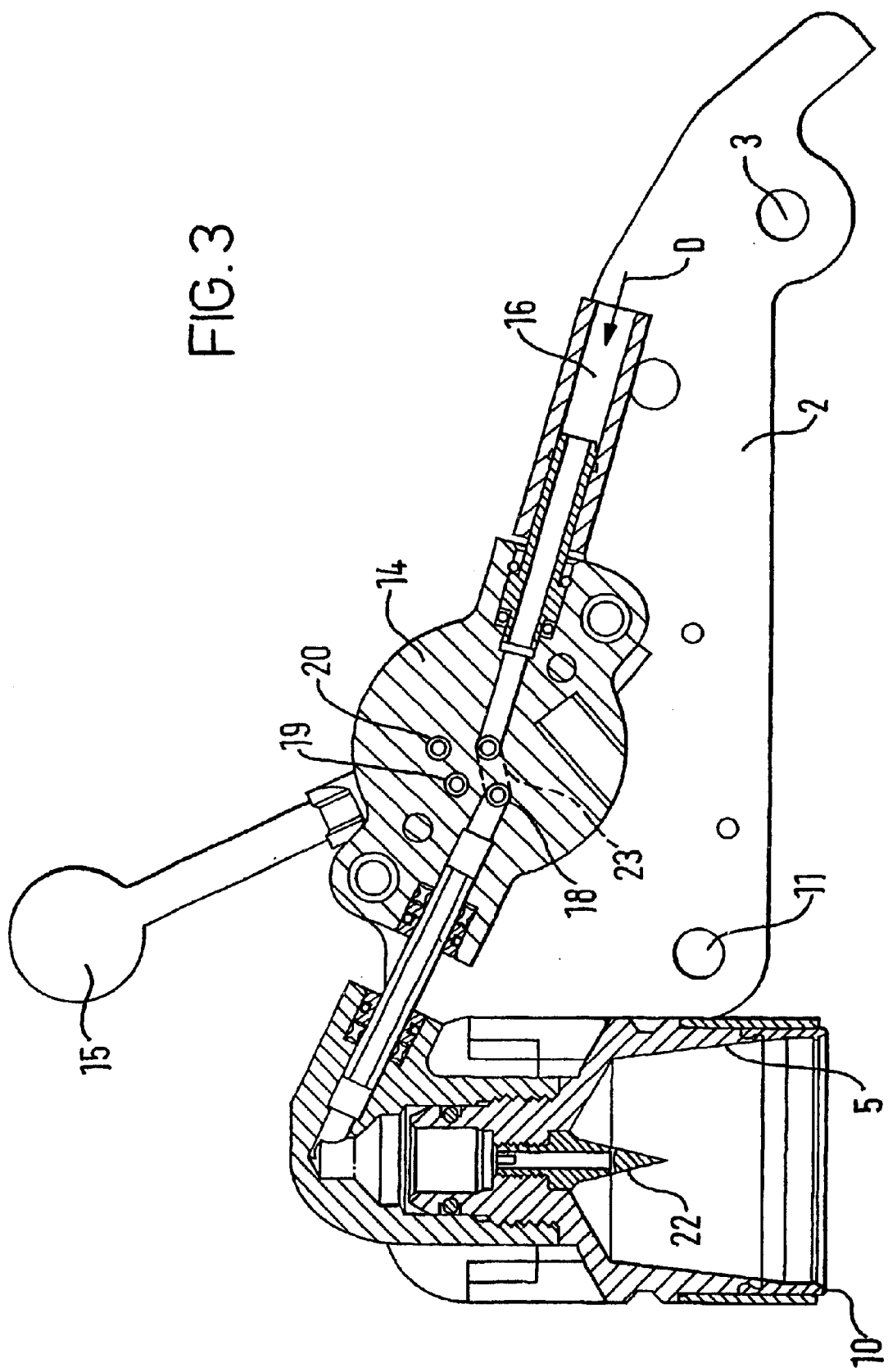
FIG. 3 is a cross-sectioned view of the device in a coffee preparation position.

FIGS. 2 and 3 show the control device, which is not illustrated in FIG. 1: this device is placed in the zone C of FIG. 1 on the moveable part (2). The identical elements have been given the same reference numerals. The moveable part (2) comprises a housing portion (5) for the cartridge to be extracted and a peripheral rim (10). The valve (14) makes it possible to direct the hot water arriving via the conduit (16) either for rejection via the conduit (17) or towards the cartridge via the conduit (21) or for steam generation. This operation is made possible by the control (15): for this purpose, the control (15) is integral with a disc comprising a switching slot, and this disc, depending on its position, puts the main hot-water intake (23) in communication either with the outlet (19) for rejection or with the outlet (18) towards the cartridge to be extracted or with the outlet (20) for the generation of steam.

The device functions as follows: a cartridge is placed in the housing portion (4) and the user closes the moveable part (2) by lowering it by means of the gripping part (8). At rest, the device is in the position shown in FIG. 2: the cartridge is in the housing (5) and the needle (22) pierces the top of the cartridge. The user then pulls the control (15) towards him, thereby putting the device into the position shown in FIG. 3: the hot water passes via the conduits (16) and (21) and arrives at a feeding member, which in the embodiment shown is a needle (22) piercing member for extracting the substance from the cartridge. This extraction is known and described in International Publication No. WO 01/15581, which is hereby expressly incorporated herein by reference thereto, since this extraction is not the subject of the present invention. The coffee flows into a cup arranged underneath the housing portion (4). When the amount of coffee in the cup is considered sufficient, the user pushes back the control (15) in order to return it to the position shown in FIG. 2: the residual water is then rejected via the conduit (17).

As mentioned above, the water that stands at the moment when the machine is not in use is only that which is in the conduit (21), thus corresponding to a volume of the order of 1–3 ml. This small amount does not have a great influence on the final temperature of the coffee obtained, that is to say it does not appreciably lower the temperature of the complete cup.

What is claimed is:

1. A flowable-food preparation device, comprising:

first and second components;

an extraction housing associated with the first and second components for receiving a substance and a fluid therein and for extracting the substance with the fluid to provide the flowable food, wherein the first component is movable for opening the housing for receiving the substance and closing the housing for extracting the substance and fluid;

a valve mounted on the first component; and a fluid intake associated with the valve for feeding the fluid thereto, wherein the valve is configured for selectively directing the fluid to or away from the housing, the valve having:

a first position for directing the fluid to the housing, a second position for directing the fluid to an outlet, and a third position for directing the fluid to a third conduit.

2. The device of claim 1, wherein the second component is substantially fixed against rotation.

3. The device of claim 1, wherein the first component is rotatable for opening and closing the housing.

4. The device of claim 3, wherein the first and second components are rotatably connected at an axis of rotation.

5. The device of claim 1, wherein the housing is configured for receiving a substance container that contains the substance.

6. The device of claim 5, further comprising a feeding member associated with the housing and configured for feeding the fluid into the container.

7. The device of claim 6, wherein the feeding member comprises a piercing member configured for piercing the container to feed the fluid into the container.

8. The device of claim 1, further comprising a valve control that is manipulable by a user and operably associated with the valve for controlling the valve.

9. The device of claim 8, wherein the valve control comprises a lever that is pivotable for operating the valve.

10. The device of claim 1, wherein the valve comprises a disk with a switching slot for selectively directing the fluid to or away from the housing.

11. The device of claim 10, wherein the valve comprises a ceramic.

12. The device of claim 1, further comprising electronics associated with the valve for operating the valve to stop further fluid from reaching the housing once a predetermined volume of fluid has been directed to the housing.

13. The device of claim 12, wherein the predetermined volume is selected for filling a cup.

14. The device of claim 1, wherein the valve is disposed sufficiently near the housing such that a volume of standing fluid of less than about 3 ml remains therebetween when the valve stops the fluid from flowing to the housing.

15. The device of claim 1, wherein the valve is operable to direct the fluid away from the housing, the liquid intake being connected for delivering the fluid such that the fluid is aqueous, and the outlet conduit is configured for delivering the fluid as steam.

16. The device of claim 1, wherein the third conduit is a rejection conduit for rejecting the fluid.

17. A beverage machine for preparation of a beverage, comprising:

first and second components;

an extraction housing associated with the first and second components for receiving a substance and a fluid therein and for extracting the substance with the fluid to provide the beverage, wherein the first component is movable for opening the housing for receiving the substance and closing the housing for extracting the substance and fluid;

a valve mounted on the first component; and a fluid intake associated with the valve for feeding the fluid thereto, wherein the valve is configured for selectively directing the fluid to or away from the housing to a rejection conduit for rejecting the fluid.

18. The beverage machine of claim 17 wherein the valve has:

a first position for directing the fluid to the housing;

a second position for directing the fluid to an outlet; and a third position for directing the fluid to the rejection conduit.

19. The beverage machine of claim 17, wherein the liquid intake is connected for delivering the fluid such that the fluid is aqueous, and the outlet conduit is configured for delivering the fluid as steam.

20. The beverage machine of claim 19, wherein the beverage machine is a coffee machine, and the beverage is coffee.

21. The beverage machine of claim 17, wherein the beverage machine is configured for placement and filling of a cup under the extraction housing.

* * * * *